(12) United States Patent
Zhang

(10) Patent No.: US 9,169,145 B2
(45) Date of Patent: *Oct. 27, 2015

(54) APPARATUS AND METHOD FOR PURIFYING AND STERILIZING WATER USING NANO CATALYTIC MICROELECTROLYSIS

(75) Inventor: Shiwen Zhang, Xiamen (CN)

(73) Assignee: Boying Xiamen Science and Technology Co., Ltd., Xiamen, Fujian Province (CN)

( * ) Notice: Subject to any disclaimer, the term of this patent is extended or adjusted under 35 U.S.C. 154(b) by 562 days.

This patent is subject to a terminal disclaimer.

(21) Appl. No.: 13/518,304

(22) PCT Filed: Jan. 28, 2011

(86) PCT No.: PCT/CN2011/070739
§ 371 (c)(1),
(2), (4) Date: Jul. 12, 2012

(87) PCT Pub. No.: WO2011/076152
PCT Pub. Date: Jun. 30, 2011

(65) Prior Publication Data
US 2012/0267316 A1    Oct. 25, 2012

(30) Foreign Application Priority Data
Dec. 21, 2009  (CN) .......................... 2009 1 0113006

(51) Int. Cl.
*B01D 17/12*    (2006.01)
*C02F 1/46*    (2006.01)
(Continued)

(52) U.S. Cl.
CPC . *C02F 9/00* (2013.01); *C02F 1/004* (2013.01); *C02F 1/444* (2013.01); *C02F 1/4674* (2013.01);
(Continued)

(58) Field of Classification Search
CPC .... B01D 17/12; B01D 21/01; B01D 21/0024; B01D 23/16; B01D 23/20; B01D 61/00; B01D 61/50; B01D 63/00; B01D 2201/16; B01D 2201/167; C02F 1/004; C02F 1/444; C02F 1/4674; C02F 1/66; C02F 1/461; C02F 1/46104; C02F 9/00; C02F 2001/46147; C02F 2201/002; C02F 2201/005; C02F 2201/007; C02F 2201/461; C02F 2201/4611; C02F 2303/04; C02F 2305/08; C02F 2101/105; C02F 2101/21; C02F 2101/308; C02F 2301/043; C02F 2301/08; C02F 2101/20; C02F 9/06
USPC ................. 204/542, 554, 600, 627, 660, 666; 210/134, 136, 192, 202, 243, 257.1, 210/258, 259, 263, 321.6, 650, 663, 669, 210/716, 748.01, 748.16, 764, 806
See application file for complete search history.

(56) References Cited

U.S. PATENT DOCUMENTS 3,676,334 A * 7/1972 Zuckerman et al. .......... 210/607
4,574,049 A * 3/1986 Pittner .......................... 210/639
(Continued)

OTHER PUBLICATIONS

Abstract of Derwent Patent Publication: CN 101525191, Pu et al, published Sep. 9, 2009.*
(Continued)

*Primary Examiner* — Joseph Drodge

(57) ABSTRACT

A method for purifying and sterilizing water using nano catalytic microelectrolysis and an apparatus therefore including three units of a nano catalytic microelectrolysis device, a sand filtration and a precise filtration are provided. $\frac{1}{20}$ to $\frac{1}{5}$ of raw water is delivered into the nano catalytic microelectrolysis. $\frac{19}{20}$ to $\frac{4}{5}$ of raw water is directly delivered into a neutralization tank to be mixed with nano catalytic microelectrolysis water to kill microorganism, algae and plankton and force suspended solids, colloid, charged particles and etc. to form into relatively large particles which are removed by the precise filtration unit; heavy metal ions gather at a cathode of the microelectrolysis to form cathode sediment to be removed; organic compounds are oxidatively decomposed by strongly oxidative substances produced by the microelectrolysis; phosphate ions move towards a cathode polarization layer and act with divalent cations on a cathode surface to produce phosphate precipitate to be removed.

15 Claims, 6 Drawing Sheets

US 9,169,145 B2
Page 2

(51) Int. Cl.
 *C02F 9/00*     (2006.01)
 *C02F 1/66*     (2006.01)
 *C02F 1/00*     (2006.01)
 *C02F 1/44*     (2006.01)
 *C02F 1/467*     (2006.01)
 *C02F 1/461*     (2006.01)
 *C02F 103/08*     (2006.01)
 *C02F 101/10*     (2006.01)
 *C02F 101/20*     (2006.01)
 *C02F 101/30*     (2006.01)

(52) U.S. Cl.
 CPC ......... *C02F 1/66* (2013.01); *C02F 2001/46147* (2013.01); *C02F 2101/105* (2013.01); *C02F 2101/20* (2013.01); *C02F 2101/308* (2013.01); *C02F 2103/08* (2013.01); *C02F 2301/043* (2013.01); *C02F 2303/04* (2013.01); *C02F 2305/08* (2013.01)

(56) References Cited

U.S. PATENT DOCUMENTS

| | | | | |
|---|---|---|---|---|
| 5,236,595 A * | 8/1993 | Wang et al. | | 210/669 |
| 5,266,203 A * | 11/1993 | Mukhopadhyay et al. | ... | 210/638 |
| 5,329,677 A * | 7/1994 | Kanzaka | | 24/687 |
| 5,505,847 A * | 4/1996 | Yamada et al. | | 210/167.13 |
| 5,605,633 A * | 2/1997 | Nakamura et al. | | 210/732 |
| 5,720,869 A * | 2/1998 | Yamanaka et al. | | 210/638 |
| 6,428,705 B1 * | 8/2002 | Allen et al. | | 210/638 |
| 7,294,270 B2 * | 11/2007 | Miyazaki et al. | | 210/610 |
| 8,071,055 B2 * | 12/2011 | Newcombe | | 422/534 |
| 8,273,249 B2 * | 9/2012 | Ren et al. | | 210/721 |
| 8,715,508 B2 * | 5/2014 | Zhang | | 210/748.01 |
| 8,715,509 B2 * | 5/2014 | Zhang | | 210/748.01 |
| 8,728,319 B2 * | 5/2014 | Zhang | | 210/636 |
| 2007/0144898 A1 * | 6/2007 | Oldani et al. | | 204/286.1 |
| 2009/0045135 A1 * | 2/2009 | Khudenko et al. | | 210/631 |
| 2009/0211919 A1 * | 8/2009 | Hegel et al. | | 205/633 |
| 2011/0233136 A1 * | 9/2011 | Enos et al. | | 210/631 |

OTHER PUBLICATIONS

Abstract of Derwent Patent Publication: CN 101428945, Chen et al, published May 13, 2009.*

Journal Article: "Micro-electrolysis technology for industrial wastewater treatment", Yi-zhong et al, Journal of Environmental Sciences, vol. 15, No. 3, pp. 334-338, published 2003.*

* cited by examiner

Effect Comparison of Freshwater Before and After Nano Catalytic Microelectrolysis

| | item | unit | standard | Sample 1 | Sample 2 | Sample 3 |
|---|---|---|---|---|---|---|
| B E F O R E | total number of bacteria | cfu/100ml | | $2.4*10^3$ | $7.2*10^3$ | $6.9*10^3$ |
| | Escherichia coli | cfu/100ml | | 20 | 150 | 560 |
| | algae | cell/100ml | | 1 | 5 | 12 |
| | $COD_{Cr}$ | mg/l | | 3.48 | 5.62 | 9.54 |
| | turbidity NTU | NTU | | 1.3 | 1.9 | 2.3 |
| | active phosphate | mg/l | | 0.005 | 0.091 | 0.062 |
| | Pb | mg/l | | 0.02 | 0.01 | 0.02 |
| | As | mg/l | | 0.01 | 0.02 | 0.05 |
| | Cr of +6 state | mg/l | | 0.06 | 0.02 | 0.07 |
| | Hg | mg/l | | 0.003 | 0.004 | 0.002 |
| | chloride | mg/l | | 355 | 295 | 512 |
| | sulfate | mg/l | | 255 | 296 | 428 |
| | fluoride | mg/l | | 0.60 | 0.42 | 0.32 |
| | total dissolved solids | mg/l | | 820 | 735 | 910 |
| | volatile phenols(phenol) | mg/l | | 0.04 | 0.06 | 0.12 |
| | nitrate | mg/l | | 12 | 11 | 19 |
| A F T E R | total number of bacteria cfu | cfu/100ml | 100 | less than 1 | less than 1 | less than 1 |
| | total coliform group | cfu/100ml | negative | negative | negative | negative |
| | thermaltolerant coliform group | cfu/100ml | negative | negative | negative | negative |
| | Escherichia coli | cfu/100ml | negative | negative | negative | negative |
| | algae | cell/100ml | none | 0 | 0 | 0 |
| | $COD_{Cr}$ | mg/l | none | 0 | 1 | 0 |
| | turbidity NTU | NTU | ≤1 | 0.1 | 0.3 | 0.2 |
| | active phosphate | mg/l | none | ≤0.001 | ≤0.001 | ≤0.001 |
| | Pb | mg/l | ≤0.01 | ≤0.001 | ≤0.001 | ≤0.001 |
| | As | mg/l | ≤0.01 | ≤0.001 | ≤0.001 | ≤0.001 |
| | Cr of +6 state | mg/l | ≤0.05 | 0.001 | 0.001 | 0.001 |
| | Hg | mg/l | ≤0.001 | 0.0005 | 0.0003 | 0.0004 |
| | chloride | mg/l | ≤250 | 195 | 182 | 211 |
| | sulfate | mg/l | ≤250 | 90 | 112 | 127 |
| | fluoride | mg/l | ≤1 | 0.10 | 0.22 | 0.12 |
| | total dissolved solids | mg/l | ≤1000 | 430 | 560 | 655 |
| | volatile phenols(phenol) | mg/l | ≤0.02 | not detected | not detected | not detected |
| | nitrate | mg/l | ≤10 | 3 | 5 | 5 |

Fig. 5

Effect Comparison of Seawater Before and After Nano Catalytic Microelectrolysis

| item | unit | before | after |
|---|---|---|---|
| total number of bacteria | cell/ml | 2.4E+03 | less than 1 |
| Escherichia coli | cell/l | 1.1E+04 | negative |
| algae | cell/ml | 9 | 0 |
| suspended solids | mg/l | 5.5 | 1 |
| $COD_{Cr}$ | mg/l | 3.8 | 0 |
| turbidity NTU | NTU | 3 | 0.3 |
| pH | | 8.06 | 8.07 |
| active phosphate | mg/l | 0.085 | 0.003 |
| Pb | mg/l | 0.009 | ≤0.001 |
| As | mg/l | 0.012 | ≤0.001 |
| Cr of +6 state | mg/l | 0.025 | ≤0.001 |
| Hg | mg/l | 0.002 | ≤0.001 |
| sulfate | mg/l | 265 | 135 |
| volatile phenols(phenol) | mg/l | 0.05 | ≤0.001 |
| inorganic nitrogen | mg/l | 0.293 | ≤0.001 |
| dissolved oxygen | | 0.725 | 0.924 |

Fig. 6

APPARATUS AND METHOD FOR PURIFYING AND STERILIZING WATER USING NANO CATALYTIC MICROELECTROLYSIS

CROSS REFERENCE OF RELATED APPLICATION

This is a U.S. National Stage under 35 USC 371 of the International Application PCT/CN2011/070739, filed on Jun. 30, 2011.

BACKGROUND OF THE PRESENT INVENTION

1. Field of Invention

The present invention relates to an apparatus for purifying and sterilizing water and a method therefor, and more particularly to an apparatus for purifying and sterilizing water using an integration of nano catalytic microelectrolysis technology and precise filtration and a method therefor.

2. Description of Related Arts

The shortage of freshwater resources and water pollution have been one of the three major environmental problems in the $21^{st}$ century. Therefore, water purification, reuse of purified waste water, i.e., reclaimed water reuse, seawater desalination and brackish water desalination have become high and new technologies winning great attentions of each country and also important measures to solve water resource crisis. The water reusing in the tap water production, seawater use and desalination, brackish water use and desalination and waste water processing requires a purification of raw water. Among many conventional water purification methods already developed and applied, some have low efficiency, some have huge energy consumption and are not economical, and others need a big investment in apparatuses. Thus from the angle of economy, the conventional methods are still unsatisfactory.

FIGS. 3 and 4 show production arts of conventional water purification technologies.

Conventional water purification arts use a purification art which uses flocculants and disinfectants to precipitate microorganism, colloid and solid granules in water and then sand filtration, multi-media filtration and membrane filtration. The purification art has a high purification cost and leads to environmental pollutions of different degrees because of the flocculants and the disinfectants added. Besides, the purification art needs a big investment in disposable apparatuses.

SUMMARY OF THE PRESENT INVENTION

An object of the present invention is to avoid existing problems in conventional water purification and sterilization arts and provide an apparatus for purifying and sterilizing water using an integration of nano catalytic microelectrolysis and precise filtration and a method therefor, so as to overcome disadvantages of big investment, high purification operation cost and secondary pollution to environment in the conventional arts.

The present invention provides a method for purifying and sterilizing water using nano catalytic microelectrolysis and an apparatus therefor comprising a water pump 1, a nano catalytic microelectrolysis tank 2, a neutralization tank 5, a sand filtration tank 6, a precise filtration device 7 and a water storage tank 8. An outlet of the water tank 1 is connected to an inlet of the nano catalytic microelectrolysis tank 2 through a first outlet of a T-joint. An outlet of the nano catalytic microelectrolysis tank 2 is connected to a first inlet of the neutralization tank 5 through a first check valve 4 and water pipes. A second outlet of the T-joint is connected to a second inlet of the neutralization tank 5 through a second check valve 3. An outlet of the neutralization tank 5 is connected to an inlet of the sand filtration tank 6. An outlet of the sand filtration tank 6 is connected to an inlet of the precise filtration device 7. An outlet of the precise filtration device 7 is connected to an inlet of the water storage tank 8.

$1/20$ to $1/5$ of raw water is delivered into the nano catalytic microelectrolysis tank 2 through the water pump 1 and the T-joint to be catalytic microelectrolyzed to generate strongly oxidative substances of a nascent state and then delivered into the neutralization tank 5 through the first check valve 4. $19/20$ to $4/5$ of the raw water is directly delivered into the neutralization tank 5 to be mixed with microelectrolysis water through water pipes and the second check valve 3, and herein the strongly oxidative substances generated by the catalytic microelectrolysis kill plankton, microorganism and virus and kill or inhibit growth of algae in the raw water; simultaneously, under action of an electric field, suspended solids, colloids dissolved in the water, charged particles, the algae and killed bacteria form into larger particles; then the water is pumped into the precise filtration device 7 to eliminate the formed larger particles after being filtrated by the sand filtration tank 6. Heavy metal ions in the water gather at a cathode of the microelectrolysis to form cathode sediment and organic compounds such as pesticide residue, colored matter and greasy dirt are removed by the strongly oxidative substances generated by the nano catalytic microelectrolysis. Phosphate ions in the water move towards a cathode polarization layer, act with divalent cations on a surface of the cathode and are removed in a form of phosphate precipitates.

Principles of cathode precipitates of the heavy metal ions, the phosphate ions and carbonate ions are following.

1. Concentration Polarization

In a state of being charged, a large number of electrons gather around the cathode, when, because of coulomb force, cations in the water, such as $H_3O^+$, $Na^+$, $Ca^{2+}$, $Mg^{2+}$, $Pb^{2+}$ and $Cu^{2+}$, begin to move towards the cathode to form a concentration polarization.

2. Electrical Double Layer

Concentration of cations increases obviously on the cathode surface, whose outer layer has anions gathered to form an electrical double layer. Moreover, anions having opposite electrical charges, such as $HPO_4^{2-}$, $HCO_3^-$ and $Cl^-$, gather on an outer layer of the electrical double layer and the anions of the outer layer are called "counter ions", showed as follows.

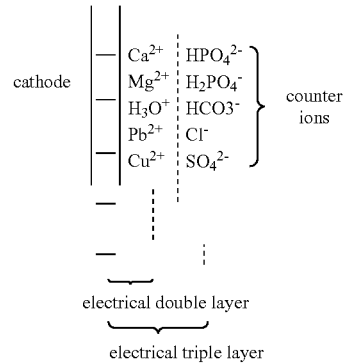

3. Acid-base Effect

Because of the formation of the electrical double layer, concentration of $HPO_4^{2-}$ etc. is greatly increased in the electrical double layer accordingly. On the cathode, a major chemical reaction is $H_2O \leftrightarrow H^+ + OH^-$;

a major electrode reaction is $2H^+ + 2e \leftrightarrow H_2\uparrow (2H_3O^+ + 2e \leftrightarrow H_2\uparrow + 2H_2O)$.

Because of a precipitate of $H_2$, around the cathode, acidity decreases and basicity increases.

4. Precipitation

Because of the acid-basic effect, a balance of $HPO_4^{2-} \leftrightarrow H^+ + PO_4^{3-}$ moves rightwards. And also because of the electrical double layer, $[Ca^{2+}]$ and $[PO_4^{3-}]$ around the cathode obviously increase, and thus a following precipitation reaction occurs.

$$3Ca^{2+} + 2PO_4^{3-} \rightarrow Ca_3(PO_4)_2\downarrow$$

By an identical manner, following precipitation reactions occur.

$$HCO_3^- \rightarrow H^+ + CO_3^{2-}$$

$$Pb^{2+} + CO_3^{2-} \rightarrow PbCO_3\downarrow$$

$$Cu^{2+} + CO_3^{2-} \rightarrow CuCO_3\downarrow$$

$$Ca^{2+} + CO_3^{2-} \rightarrow CaCO_3\downarrow$$

Productions including $Ca_3(PO_4)_2$, $CaCO_3$ and etc. deposit on the cathode surface to form a cathode deposition.

The nano catalytic microelectrolysis has some difference with normal electrolysis. The strongly oxidative substances produced in a nano catalytic microelectrolysis of freshwater is [O] and [Cl] of a nascent state, rather than oxygen produced in the normal electrolysis thereof; the strongly oxidative substances produced in a nano catalytic microelectrolysis of seawater and brackish water is [Cl] of a nascent state, rather than chlorine produced in the normal electrolysis thereof.

The microelectrolysis tank has an operating voltage of 2V to 18V and a current intensity of 1 A to 50,000 A. The plankton, the microorganism, the virus and etc. in the water are killed in the neutralization tank by the strongly oxidative substances. Under the action of the electrical field, the suspension, the colloids and the charged particles form into the relatively large particles which are removed after filtration of the sand filtration tank 6 and the precise filtration device 7 for purifying the water.

A preferred operating voltage of the microelectrolysis is between 3V to 10V and a preferred current intensity is between 5 A to 1,000 A.

The precise filtration device 7 is one member selected from a group consisting of a filter bag filtration, a fiber cartridge filtration, a polypropylene (PP) cotton filtration, a microfiltration membrane filtration and an ultrafiltration membrane filtration.

The PP cotton filtration is made by PP cotton materials having a hole diameter between 0.10 μm to 5 μm.

The fiber cartridge filtration is made by fiber cartridge materials having a hole diameter between 0.10 μm to 5 μm.

The microfiltration membrane filtration is made by membrane materials of a ceramic membrane having a hole diameter between 0.05 μm to 0.1 μm, or of an organic membrane which stays materials with molecular weight of more than 50,000 daltons.

The ultrafiltration membrane filtration is made by membrane materials of an organic ultrafiltration membrane which stays materials with molecular weight of more than 1,000 daltons; a membrane assembly is a tube-typed membrane assembly or a roll-typed membrane assembly.

The filter bag filtration is made by filter bag materials having a hole diameter between 0.10 μm to 5 μm.

Using the nano catalytic microelectrolysis to purify and sterilize water has following outstanding results.

1. Purification and Sterilization of the Freshwater (1) The [O] and [Cl] of a nascent state produced in the nano catalytic microelectrolysis kill the algae, the microorganism, the virus and the plankton in the water to reduce a number of microorganism living bodies to be below 30 per millimeter, so as to eliminate pollutions of the algae and the microorganism.

(2) The organic compounds and the pesticide residue in the water are oxidatively decomposed; the colored matter is rapidly decomposed and $COD_{Cr}$ is reduced.

(3) Under the action of the electrical field, the suspension, the colloid and the charged particles in the water assemble into the relatively large particles which are removed by rough filtration and precise filtration to purify the water.

(4) The heavy metal ions in the water move towards the cathode of the microelectrolysis tank to precipitate at the cathode, so as to reduce content of the heavy metal ions in the water.

(5) The phosphate ions in the water are precipitated in a large amount to lead to a lacking of phosphorus which affects DNA copying of the algae, so as to inhibit growth and reproduction of the algae in the water.

Clean water obtained by using the nano catalytic microelectrolysis to purify and sterilize water can be drunk directly.

2. Seawater, Brackish Water or Saltwater Having Much Sodium Chloride (1) The [Cl] of a nascent state produced by the nano catalytic microelectrolysis kills the algae, the microorganism, the virus and the plankton in the water to reduce a number of microorganism living bodies to be below 30 per millimeter to remove pollutions of the algae and the microorganism.

(2) The organic compounds and the pesticide residue in the water are oxidatively decomposed; the colored matter is rapidly decomposed and $COD_{Cr}$ is reduced.

(3) Under the action of the electrical field, the suspension, the colloid and the charged particles in the water assemble into the relatively large particles which are removed by rough filtration and precise filtration to purify the water.

(4) The heavy metal ions in the water move towards the cathode of the microelectrolysis tank to precipitate at the cathode, so as to reduce content of the heavy metal ions in the water.

(5) The phosphate ions in the water are precipitated in a large amount to lead to a lacking of phosphorus which affects DNA copying of the algae, so as to inhibit growth and reproduction of the algae in the water.

Using the nano catalytic microelectrolysis to purify and sterilize water has following outstanding advantages.

1. Extremely Low Energy Consumption and Small Operating Cost

For the freshwater, energy consumption for purifying and sterilizing per day is 0.01 kwh/T; counting an electricity price of 1 yuan/kwh, an operating cost of purifying and sterilizing per day is 0.0089 yuan/T. For the seawater and the brackish water, the energy consumption for purifying and sterilizing per day is 0.004 kwh/T; counting an electricity price of 1 yuan/kwh, the operating cost of purifying and sterilizing per day is 0.0045 yuan/T.

2. Small Production Apparatuses and Fast Purification and Sterilization

Normal purification of flocculation, precipitation and sterilization requires a pool for flocculating and precipitating and another pool for sterilizing and purifying, also a relatively long time and relatively large pools, which needs a large area and a big investment. However, the nano catalytic microelectrolysis for purifying and sterilizing water only requires the raw water to flow through the microelectrolysis tank, which needs small apparatuses and an operating time within 25 minutes.

These and other objectives, features, and advantages of the present invention will become apparent from the following detailed description, the accompanying drawings, and the appended claims.

BRIEF DESCRIPTION OF THE DRAWINGS

FIG. 5 is a diagram of purification test results of freshwater processed by the method according to preferred embodiments of the present invention.

FIG. 6 is a diagram of purification test results of seawater processed by the method according to a preferred embodiment of the present invention.

DETAILED DESCRIPTION OF THE PREFERRED EMBODIMENT

Combined with the drawings, further illustration about the present invention is following.

Figure 1:
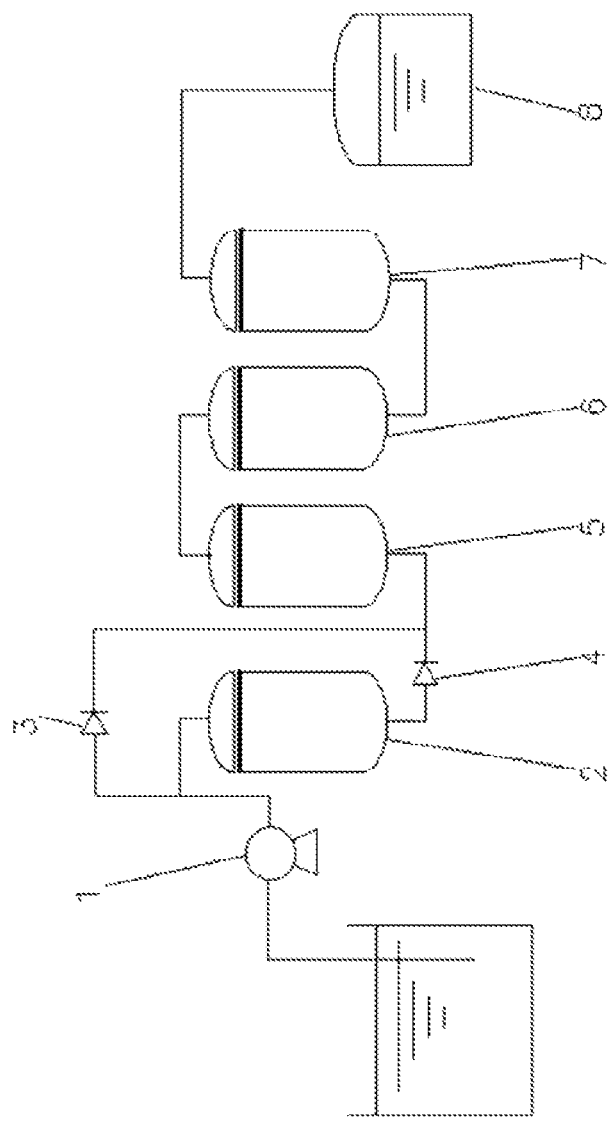
FIG. 1 is a sketch view of an apparatus for purifying and sterilizing water using nano catalytic microelectrolysis according to a preferred embodiment of the present invention.
Figure 2:
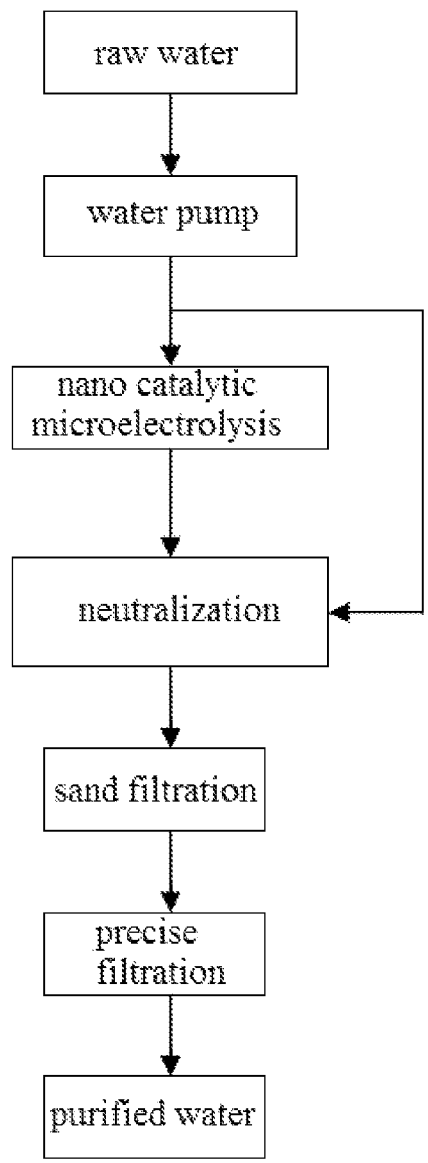
FIG. 2 is a block diagram of a method for purifying and sterilizing water using nano catalytic microelectrolysis according to the preferred embodiment of the present invention.
Figure 3:
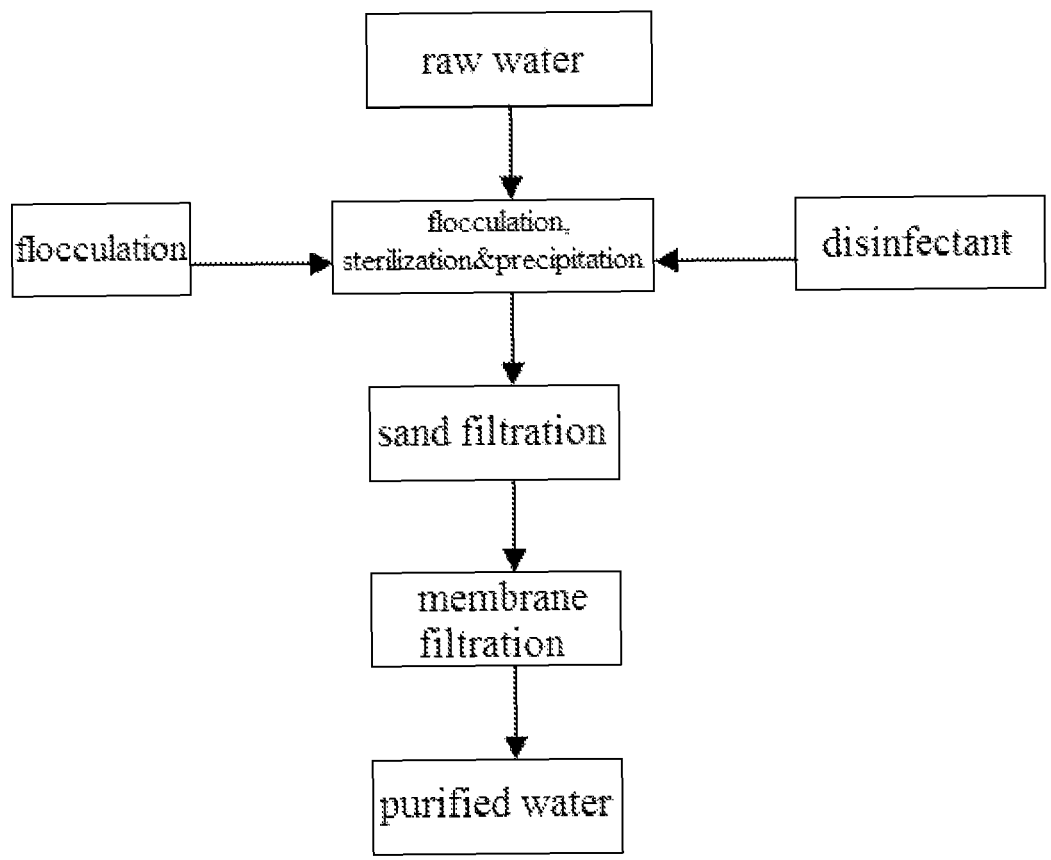
FIG. 3 is a block diagram of a first conventional method for purifying and sterilizing water according to prior arts.
Figure 4:
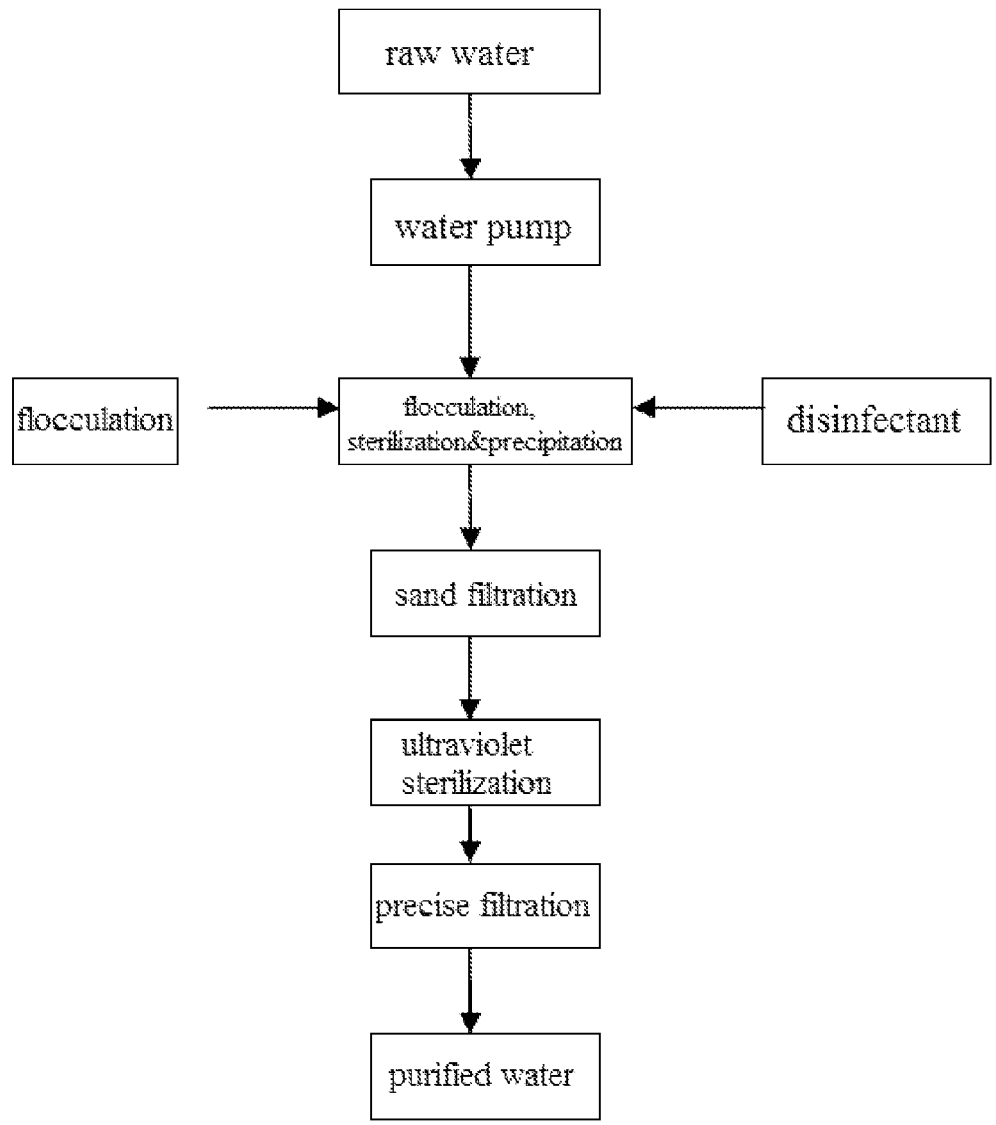
FIG. 4 is a block diagram of a second conventional method for purifying and sterilizing water according to the prior arts.

Referring to FIG. 1 of the drawings, the present invention provides a method for purifying and sterilizing water using nano catalytic microelectrolysis and an apparatus therefor comprising a water pump 1, a nano catalytic microelectrolysis tank 2, a neutralization tank 5, a sand filtration tank 6, a precise filtration device 7 and a water storage tank 8. An outlet of the water tank 1 is connected to an inlet of the nano catalytic microelectrolysis tank 2 through a first outlet of a T-joint. An outlet of the nano catalytic microelectrolysis tank 2 is connected to a first inlet of the neutralization tank 5 through a first check valve 4 and water pipes. A second outlet of the T-joint is connected to a second inlet of the neutralization tank 5 through a second check valve 3. An outlet of the neutralization tank 5 is connected to an inlet of the sand filtration tank 6. An outlet of the sand filtration tank 6 is connected to an inlet of the precise filtration device 7. An outlet of the precise filtration device 7 is connected to an inlet of the water storage tank 8.

The precise filtration device 7 is one selected from a group consisting of a filter bag filtration, a fiber cartridge filtration, a PP cotton filtration, a microfiltration membrane filtration and an ultrafiltration membrane filtration.

$1/20$ to $1/5$ of raw water is delivered into the nano catalytic microelectrolysis tank 2 through the water pump 1 and the T-joint to be catalytic microelectrolyzed to generate strongly oxidative substances of a nascent state and then delivered into the neutralization tank 5 through the first check valve 4. $19/20$ to $4/5$ of the raw water is directly delivered into the neutralization tank 5 to be mixed with microelectrolysis water through water pipes and the second check valve 3, and herein the strongly oxidative substances generated by the catalytic microelectrolysis kill plankton, microorganism and virus and kill or inhibit growth of algae in the raw water; simultaneously, under action of an electric field, suspended solids, colloids dissolved in the water, charged particles, the algae and killed bacteria form into larger particles; then the water is pumped into the PP cotton filtration device 7 to remove solid impurities, the plankton, the colloid and the bacteria after being filtrated by the sand filtration tank 6, so as to produce clean water and store the clean water in the water storage tank 8.

The nano catalytic microelectrolysis has following functions.

(1) The algae, the plankton, the microorganism and the virus in the raw water are killed by the produced strongly oxidative substances; and under an action of an electrical field, the plankton, the suspended solids, the colloid and the bacteria form into larger crystal cores.

(2) Heavy metal ions in the water gather at a cathode of the microelectrolysis to form cathode sediment, so as to reduce concentration of the heavy metal ions and remove harm of heavy metal ions.

(3) Organic compounds such as pesticide residue, colored matter and greasy dirt are oxidatively decomposed by the strongly oxidative substances produced by the nano catalytic microelectrolysis.

(4) The heavy metal ions in the water move towards the cathode of the microelectrolysis tank to precipitate at the cathode, so as to reduce a content of the heavy metal ions in the water.

(5) Phosphate ions in the water on a cathode polarization layer and cations form precipitate to remove the phosphate ions.

(6) The phosphate ions in the water are precipitated in a large amount to lead to a lacking of phosphorus which affects DNA copying of the algae, so as to inhibit growth and reproduction of the algae in the water.

A neutralization of the neutralization tank 5 has following functions.

(1) $19/20$ to $4/5$ of the raw water entering the neutralization tank 5 neutralizes and consumes the strongly oxidative substances produced by the nano catalytic microelectrolysis.

(2) The strongly oxidative substances produced by the nano catalytic microelectrolysis kills the algae, the microorganism and the virus in the raw water.

(3) The crystal core produced by the nano catalytic microelectrolysis forms into larger particles to precipitate with the suspended solids, the colloid and the bacteria in the raw water.

Preferred embodiments of the present invention using the apparatus for purifying and sterilizing water using nano catalytic microelectrolysis as showed in FIG. 1 are as follows.

Embodiment One

A purification and sterilization method for producing potable water 3,000 T per day for a residential community is following.

Raw water of 3,000 T tap water is extracted at a flow speed of 150 T/H by a water pump 1. A part of the raw water is delivered into a nano catalytic microelectrolysis tank 2 at a flow speed of 7.5 T/H through a T-joint. After a catalytic microelectrolysis, the part of the raw water is delivered into a neutralization tank 5 through a first check valve 4. The rest part of the raw water is delivered directly into the neutralization tank 5 at a speed of 142.5 T/H through the T-joint and a second check valve 3 to be mixed and precipitated with nano catalytic microelectrolysis water. Algae, plankton, microorganism and virus in the raw water are killed by [O] and [Cl] of a nascent state produced by the nano catalytic microelectrolysis to reduce organism living bodies in waste water to be below 30 per millimeter and remove pollutions of the algae, the plankton and the virus; organic compounds, pesticide residue, colored matter in the tap water are oxidatively decomposed by [O] and [Cl] of a nascent state produced by the nano catalytic microelectrolysis, and $COD_{Cr}$ is reduced thereby. In a microelectrolysis tank 2, suspended solids, colloid and charged particles from the tap water destabilize and assemble under action of an electrical field to form into relatively large particles as crystal cores; the relatively large particles further act with the suspended solids, the colloid, the killed microorganism and the algae to form into larger crystal cores which precipitate with the colloid, the suspended solids, the killed microorganism and the algae in the raw water in the neutralization tank 5. Heavy metal ions in the water move towards a cathode in the microelectrolysis tank to precipitate at the cathode, so as to reduce content of the heavy metal ions in the waste water. Phosphate ions in the water precipitate with cations at a cathode polarization layer to be removed. The phosphate ions in the water are precipitated in a large amount to lead to a lacking of phosphorus which affects DNA copying of the algae, so as to inhibit growth and reproduction of the algae in the water. The water after being processed by the neutralization tank 5 is further roughly filtrated by a sand filtration tank 6 and precisely filtrated by a precise filtration device 7 to be purified.

The precise filtration device 7 is an ultrafiltration membrane filtering unit whose ultrafiltration membrane is an organic membrane which stays materials with molecular weight of more than 1,000 daltons; whose membrane assembly is a tube-typed membrane assembly or a roll-typed membrane assembly.

The nano catalytic microelectrolysis has an operating voltage between 8V and 10V and a current intensity between 130 and 135 A. [Cl] of a nascent state produced by the nano catalytic microelectrolysis kills the microorganism in the waste water and oxidatively decomposed the organic compounds in the waste water and, under the action of the electrical field, the suspended solids, the colloid and the charged particles in the water form into the relatively large particles which are filtered by a rough filtration and a precise filtration to be removed for purifying. Test results thereof are showed in FIG. 5 as sample 1.

Embodiment Two

A method for purifying and sterilizing tap water 10,000 T per day is following.

Raw water of 10,000 T tap water is extracted at a flow speed of 417 T/H by a water pump 1. A part of the raw water is delivered into a nano catalytic microelectrolysis tank 2 at a flow speed of 85 T/H through a T-joint. After a catalytic microelectrolysis, the part of the raw water is delivered into a neutralization tank 5 through a first check valve 4. The rest part of the raw water is delivered directly into the neutralization tank 5 at a speed of 332 T/H through the T-joint and a second check valve 3 to be mixed and precipitated with nano catalytic microelectrolysis water. Algae, plankton, microorganism and virus in the raw water are killed by [O] and [Cl] of a nascent state produced by the nano catalytic microelectrolysis to reduce organism living bodies in waste water to be below 30 per millimeter and remove pollutions of the algae, the plankton and the virus; organic compounds, pesticide residue, colored matter in the tap water are oxidatively decomposed by [O] and [Cl] of a nascent state produced by the nano catalytic microelectrolysis, and $COD_{Cr}$ is reduced thereby. In a microelectrolysis tank 2, colloid dissolved in the raw water and charged particles assemble under action of an electrical field to form into relatively large particles as crystal cores; the relatively large particles further act with suspended solids, the plankton, killed microorganism and the algae to form into larger crystal cores which precipitate with the colloid, the suspended solids, the killed microorganism and the algae in the raw water in the neutralization tank 5. Heavy metal ions in the water move towards a cathode in the microelectrolysis tank to precipitate at the cathode, so as to reduce content of the heavy metal ions in the waste water. Phosphate ions in the water precipitate with cations at a cathode polarization layer to be removed. The phosphate ions in the water are precipitated in a large amount to lead to a lacking of phosphorus which affects DNA copying of the algae, so as to inhibit growth and reproduction of the algae in the water. The water after being processed by the neutralization tank 5 is further roughly filtrated by a sand filtration tank 6 and precisely filtrated by a precise filtration device 7 to be purified.

The precise filtration device 7 is a microfiltration filtering unit whose microfiltration membrane is an organic membrane which stays materials having molecular weight of more than 50,000 daltons; whose membrane assembly is a tube-typed membrane assembly or a roll-typed membrane assembly.

The nano catalytic microelectrolysis has an operating voltage between 6V and 8V and a current intensity between 270 A and 280 A. [Cl] of a nascent state produced by the nano catalytic microelectrolysis kills the microorganism in the waste water and oxidatively decomposed the organic compounds in the waste water, and, under the action of the electrical field, the suspended solids, the colloid and the charged particles in the water form into the relatively large particles which are removed by a rough filtration and a precise filtration for purifying. Test results thereof are showed in FIG. 5 as sample 2.

Embodiment Three

A method for purifying and sterilizing tap water 50,000 T per day is following.

Raw water of 50,000 T tap water is extracted at a flow speed of 2,085 T/H by a water pump 1. A part of the raw water is delivered into a nano catalytic microelectrolysis tank 2 at a flow speed of 210 T/H through a T-joint. After a catalytic microelectrolysis, the part of the raw water is delivered into a neutralization tank 5 through a first check valve 4. The rest part of the raw water is delivered directly into the neutralization tank 5 at a speed of 1875 T/H through the T-joint and a second check valve 3 to be mixed and precipitated with nano catalytic microelectrolysis water. Algae, plankton, microorganism and virus in the raw water are killed by [O] and [Cl] of a nascent state produced by the nano catalytic microelectrolysis to reduce organism living bodies in waste water to be below 30 per millimeter and remove pollutions of the algae, the microorganism and the virus; organic compounds, pesticide residue, colored matter in the tap water are oxidatively decomposed by [O] and [Cl] of a nascent state produced by the nano catalytic microelectrolysis, and $COD_{Cr}$ is reduced thereby. In a microelectrolysis tank 2, colloid dissolved in the raw water and charged particles assemble under action of an electrical field into relatively large particles as crystal cores; the relatively large particles further act with suspended solids, the plankton, the killed microorganism and the algae to form into larger crystal cores which precipitate with the colloid, the suspended solids, the killed microorganism and the algae in the raw water in the neutralization tank 5. Heavy metal ions in the water move towards a cathode in the microelectrolysis tank to precipitate at the cathode, so as to reduce content of the heavy metal ions in the waste water. Phosphate ions in the water precipitate with cations at a cathode polarization layer to be removed. The phosphate ions in the water are precipitated in a large amount to lead to a lacking of phosphorus which affects DNA copying of the algae, so as to inhibit growth and reproduction of the algae in the water. The water after being processed by the neutralization tank 5 is further roughly filtrated by a sand filtration tank 6 and precisely filtrated by a precise filtration device 7 to be purified.

The precise filtration device 7 is a microfiltration filtering unit whose microfiltration membrane is an organic membrane which stays materials having molecular weight of more than 50,000 daltons; whose membrane assembly is a tube-typed membrane assembly.

The nano catalytic microelectrolysis has an operating voltage between 9V and 10V and a current intensity between 1,700 A and 1,750 A. [Cl] of a nascent state produced by the nano catalytic microelectrolysis kills the microorganism in the waste water and oxidatively decomposed the organic compounds in the waste water, and, under the action of the electrical field, the suspended solids, the colloid and the charged particles in the water form into the relatively large particles which are removed by a rough filtration and a precise filtration for purifying. Test results thereof are showed in FIG. 5 as sample 3.

Embodiment Four

A method for purifying and sterilizing seawater 2,500 T per day is following.

Raw water of 2,500 T seawater is extracted at a flow speed of 104 T/H by a water pump 1. A part of the raw water is delivered into a nano catalytic microelectrolysis tank 2 at a flow speed of 10 T/H through a T-joint. After a catalytic microelectrolysis, the part of the raw water is delivered into a neutralization tank 5 through a first check valve 4. The rest part of the raw water is delivered directly into the neutralization tank 5 at a speed of 94.2 T/H through the T-joint and a second check valve 3 to be mixed and precipitated with nano catalytic microelectrolysis water. Algae, plankton, microorganism and virus in the raw water are killed by [Cl] of a nascent state produced by the nano catalytic microelectrolysis to reduce organism living bodies in seawater to be below 30 per millimeter and remove pollutions of the algae, the microorganism and the virus; organic compounds, pesticide residue, colored matter in the water are oxidatively decomposed by [Cl] of a nascent state produced by the nano catalytic microelectrolysis, and $COD_{Cr}$ is reduced thereby. In a microelectrolysis tank 2, colloid dissolved in the raw water and charged particles assemble under action of an electrical field into relatively large particles as crystal cores; the relatively large particles further act with suspended solids, the plankton, killed microorganism and the algae to form into larger crystal cores which precipitate with the colloid, the suspended solids, the killed microorganism and the algae in the raw water in the neutralization tank 5. Heavy metal ions in the water move towards a cathode in the microelectrolysis tank to precipitate at the cathode, so as to reduce content of the heavy metal ions in the waste water. Phosphate ions in the water precipitate with cations at a cathode polarization layer to be removed. The phosphate ions in the water are precipitated in a large amount to lead to a lacking of phosphorus which affects DNA copying of the algae, so as to inhibit growth and reproduction of the algae in the water. The water after being processed by the neutralization tank 5 is further roughly filtrated by a sand filtration tank 6 and precisely filtrated by a precise filtration device 7 to be purified.

The precise filtration device 7 is a filter bag filtering unit whose filter bag materials have a hole diameter of 0.10 μm to 5 μm.

The nano catalytic microelectrolysis has an operating voltage between 3V and 5V and a current intensity between 9 A and 12 A. [Cl] of a nascent state produced by the nano catalytic microelectrolysis kills the microorganism in the waste water and oxidatively decomposed the organic compounds in the waste water, and, under the action of the electrical field, the suspended solids, the colloid and the charged particles in the water form into the relatively large particles which are removed by a rough filtration and a precise filtration for purifying. Test results thereof are showed in FIG. 6.

Using the nano catalytic microelectrolysis to purify and sterilize the seawater has following outstanding results.

(1) The [Cl] of a nascent state produced by the nano catalytic microelectrolysis kills the algae, the microorganism, the virus and the plankton in the water to reduce a content of microorganism living bodies to be below 30 per millimeter to remove pollutions of the algae and the microorganism.

(2) The organic compounds and the pesticide residue in the water are oxidatively decomposed; the organic compounds including matters having palladium are rapidly decomposed and $COD_{Cr}$ is reduced.

(3) Under the action of the electrical field, the suspension, the colloid dissolved in the water and the charged particles in the water assemble into the larger particles which are removed by rough filtration and precise filtration to purify the water.

(4) The heavy metal ions in the water move towards the cathode of the microelectrolysis tank to precipitate at the cathode, so as to reduce the content of the heavy metal ions in the water.

(5) The phosphate ions in the water are precipitated in a large amount to lead to a lacking of phosphorus which affects DNA copying of the algae, so as to inhibit the growth and the reproduction of the algae in the water.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An apparatus for purifying and sterilizing water using nano catalytic microelectrolysis, comprising a water pump, a nano catalytic microelectrolysis tank, a neutralization tank, a sand filtration tank, a precise filtration device and a water storage tank, wherein a first outlet of a T-joint connects an outlet of said water pump to an inlet of said nano catalytic microelectrolysis tank; a first check valve and water pipes connect an outlet of said nano catalytic microelectrolysis tank to a first inlet of said neutralization tank; a second check valve connects a second outlet of said T-joint to a second inlet of said neutralization tank; an outlet of said neutralization tank is connected to an inlet of said sand filtration tank; an outlet of said sand filtration tank is connected to an inlet of said precise filtration device; and an outlet of said precise filtration device is connected to an inlet of said water storage tank.

2. A method for purifying and sterilizing water with the apparatus as recited in claim 1, comprising following steps of:
obtaining raw water by the water pump; delivering 1/20 to 1/5 of a volume of the raw water into the nano catalytic microelectrolysis tank through the T-joint to produce strongly oxidative substances of a nascent state and then into the neutralization tank through the first check valve; directly delivering remained 19/20 to 4/5 of the volume of the raw water into the neutralization tank through water pipes and the second check valve to be mixed and precipitated with nano catalytic microelectrolysis water, filtering by the sand filtration tank and pumping the water into the precise filtration device to filter and remove solid impurities, plankton, colloid and bacteria in the water to produce purified water and finally storing the purified water in the water storage tank.

3. The method, as recited in claim 2, wherein the nano microelectrolysis has an operating voltage of 2V to 18V and a current intensity of 1 A to 5,000 A; the strongly oxidative substances produced by the nano microelectrolysis is for killing the plankton, microorganism and virus in the raw water and killing or inhibiting growth of algae and under action of an electrical field force suspended solids, the colloid dissolved in the water, charged particles, the algae and killed bacterial to form into relatively large particles which are removed by precise filtration device after being filtered by sand filtration and pumped therein; heavy metal ions in the water gather at a cathode of the microelectrolysis to form cathode sediment to be removed; organic compounds in the watering including pesticide residue, colored matter and greasy oil are oxidatively decomposed by the strongly oxidative substances produced by the nano catalytic microelectrolysis; phosphate ions in the water move towards a cathode polarization layer and act with divalent cations on a cathode surface to produce phosphate precipitate to be removed.

4. The method, as recited in claim 2, wherein for freshwater the strongly oxidative substances produced by the nano catalytic microelectrolysis comprise [O] of a nascent state and [Cl] of a nascent state which are for killing microorganism in waste water to reduce microorganism living bodies in the waste water to be below 30 per millimeter and generate negativity of coliform group, removing pollution of the microorganism, precipitating heavy metal ions and phosphate ions in the water, oxidatively decomposing organic compounds and pesticide residue in the water, rapidly decomposing colored matter and reducing $COD_{Cr}$.

5. The method, as recited in claim 2, wherein for seawater and brackish water the strongly oxidative substances produced by the nano catalytic microelectrolysis comprise [Cl] of a nascent state which is for killing microorganism in waste water to reduce microorganism living bodies in the waste water to be below 30 per millimeter and generate negativity of coliform group, removing pollution of the microorganism, oxidatively decomposing organic compounds and pesticide residue in the water, rapidly decomposing colored matter and reducing CODCr.

6. The method, as recited in claim 2, wherein the nano microelectrolysis preferably works under an operating voltage between 3V and 10V and a current intensity between 5 A and 3,000 A.

7. The method, as recited in claim 2, wherein the precise filtration device is one member selected from a group consisting of a filter bag filtration, a fiber cartridge filtration, a PP cotton filtration, a microfiltration membrane filtration and an ultrafiltration membrane filtration.

8. The method, as recited in claim 7, wherein the precise filtration is made by membrane materials of a ceramic membrane having a hole diameter of 0.05 μm to 0.1 μm.

9. The method, as recited in claim 7 wherein the precise filtration is made by membrane materials of an ultrafiltration membrane which stays materials with molecular weight of more than 1,000 daltons; a membrane assembly thereof is tube-typed or roll-typed.

10. The method, as recited in claim 7, wherein the precise filtration is made by filter bag materials having a hole diameter of 0.10 μm to 5 μm.

11. The method, as recited in claim 7, wherein the precise filtration is made by membrane materials of a ceramic membrane having a hole diameter of 0.05 μm to 0.1 μm.

12. The method, as recited in claim 7, wherein the precise filtration is made by membrane materials of an organic membrane which stays materials with molecular weight of more than 50,000 daltons; a membrane assembly thereof is tube-typed or roll-typed.

13. The method, as recited in claim 7, wherein the precise filtration is made by membrane materials of an organic membrane which stays materials with molecular weight of more than 50,000 daltons; a membrane assembly thereof is tube-typed or roll-typed.

14. The method, as recited in claim 2, wherein the precise filtration is made by membrane materials of an ultrafiltration membrane which stays materials with molecular weight of more than 1,000 daltons; a membrane assembly thereof is tube-typed or roll-typed.

15. The method, as recited in claim 2, wherein the precise filtration is made by filter bag materials having a hole diameter of 0.10 μm to 5 μm.

* * * * *